Figure 1:
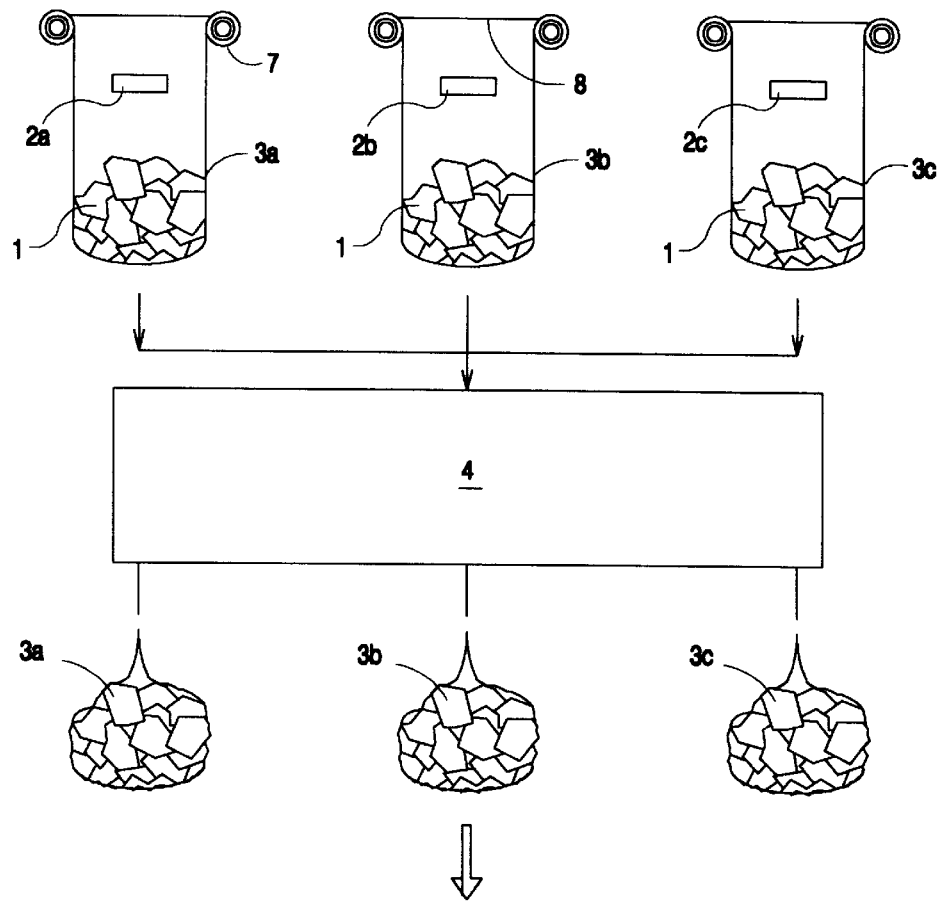
Figure 1:
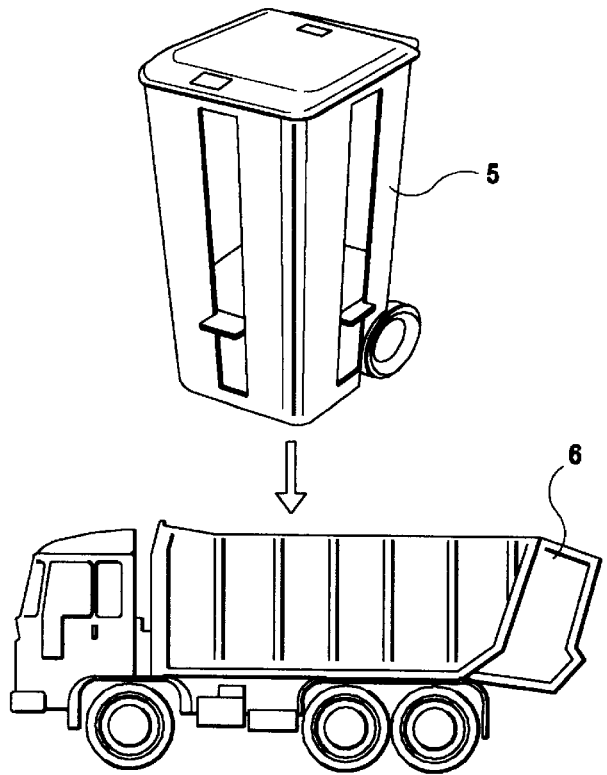

United States Patent
Esser et al.

[19]

[11] Patent Number: 6,131,371
[45] Date of Patent: Oct. 17, 2000

[54] WASTE COLLECTION AND DISPOSAL PROCESS

[75] Inventors: Hans-Peter Esser; Joachim D. Hein, both of Frechen, Germany

[73] Assignee: Peter Tils, Germany

[21] Appl. No.: 09/000,050

[22] PCT Filed: Jul. 19, 1996

[86] PCT No.: PCT/EP96/03197

§ 371 Date: Nov. 6, 1998

§ 102(e) Date: Nov. 6, 1998

[87] PCT Pub. No.: WO97/03899

PCT Pub. Date: Feb. 6, 1997

[30] Foreign Application Priority Data

| Jul. 21, 1995 | [DE] | Germany | 195 30 598 |
| Jan. 8, 1996 | [DE] | Germany | 196 00 370 |
| Mar. 15, 1996 | [DE] | Germany | 196 10 229 |
| Mar. 19, 1996 | [DE] | Germany | 196 10 859 |

[51] Int. Cl.$^7$ .............................. B65B 31/00; B65B 43/26
[52] U.S. Cl. .................. 53/433; 53/459; 53/449; 209/930
[58] Field of Search .............. 53/459, 433, 576, 53/567, 511, 449; 209/930

[56] References Cited

U.S. PATENT DOCUMENTS

| 3,563,002 | 2/1971 | Givin ........................................ 53/567 |
| 3,763,621 | 10/1973 | Klein et al. ............................ 53/576 X |
| 3,815,649 | 6/1974 | Delmar .................................. 53/576 X |
| 4,044,524 | 8/1977 | Segale et al. . | |
| 4,601,159 | 7/1986 | Mugnai ..................................... 53/511 |
| 5,018,876 | 5/1991 | Mennella . | |
| 5,027,578 | 7/1991 | Natterer et al. . | |
| 5,072,833 | 12/1991 | Hansen et al. . | |
| 5,100,005 | 3/1992 | Noble et al. . | |
| 5,155,976 | 10/1992 | Okabe et al. ......................... 53/576 X |
| 5,263,520 | 11/1993 | Arai . | |
| 5,425,456 | 6/1995 | Erickson . | |
| 5,590,512 | 1/1997 | Richards et al. ......................... 53/567 |

FOREIGN PATENT DOCUMENTS

| 537771 | 4/1993 | European Pat. Off. . |
| 156606 | 6/1994 | Japan . |
| 2241937 | 9/1991 | United Kingdom . |

*Primary Examiner*—Linda Johnson
*Attorney, Agent, or Firm*—Liniak, Berenato, Longarce & White, LLC

[57] ABSTRACT

A process is disclosed for collecting and disposing of waste (1), in particular household rubbish. Waste is separately collected and sorted at the place at which it is produced in plastic bags (3a, 3b, 3c) provided with appropriate distinguishing markings (2a, 2b, 2c) in accordance with recycling criteria. Portions of waste (4) are packaged by closing and vacuum-sealing the plastic bags, and the closed and vacuum-sealed bags that contain the various types of waste are placed together at random into at least one common garbage container (5) and transported to a central collecting point where the plastic bags are sorted according to their markings for final disposal and/or recycling.

13 Claims, 2 Drawing Sheets

U.S. Patent  Oct. 17, 2000  Sheet 1 of 2  6,131,371

WASTE COLLECTION AND DISPOSAL PROCESS

The invention concerns a method for collecting and disposing of wastes, in particular household wastes, in which the waste is collected separately, on the basis of material recycling criteria, in plastic-film receptacles which can be distinguished from one another by corresponding markings, and the plastic-film receptacles are taken to a central collection point for final storage and/or further use and there sorted according to their markings.

New laws and ordinances concerning the avoidance, reduction, reprocessing, and reutilization of garbage demand frugal use of packaging material, utilization of reusable packaging, and especially appropriate sorting, for recycling, of wastes which are produced. For this reason, there have already existed for some time containers, set up centrally by communities, into which end users can dump their waste paper and used glass.

Garbage sorting also takes place in households, a three-part separation into organic wastes, plastics, and other wastes usually being performed. Although this garbage separation contributes to savings in reusable materials, it entails problems with regard to "garbage hygiene." In other words, the distribution of garbage into different bins greatly increases the residence time of the garbage in the household, since the individual bins containing wastes of various kinds are emptied only at relatively long intervals. With organic garbage in particular, it has been found that storage of food residues in organic waste bins can lead, after only a few days, to contamination with spores, bacteria, maggots, etc. In addition, unpleasant odors can develop relatively quickly.

Furthermore, garbage separation as usually performed today also requires special garbage transport vehicles with chambers, separated from one another, for the various wastes, is such a way that must each be capable of being loaded with garbage and individually emptied. Garbage transport vehicles are accordingly of relatively complex configuration, and thus expensive. Alternatively, the bins containing the various kinds of garbage can also be picked up separately. This is, however, also complex and therefore expensive.

To eliminate this problem, it is proposed in EP-A-0 537 771 that the different garbage fractions be collected in correspondingly marked garbage bags, and the garbage bags be disposed of together with the garbage. The result of this feature is that the various garbage fractions can be carried off in a garbage vehicle but the latter does not need to be equipped with separate chambers, since the garbage fractions can easily be separated once again on the basis of the markings of the garbage bags when the garbage vehicle is unloaded. Problems nevertheless still occur with regard to garbage hygiene, since the individual garbage bags containing different types of waste are emptied only at relatively long time intervals.

It is therefore the object of the invention to configure a method of the kind cited initially for collecting and disposing of household wastes in such a way that, while retaining the requisite garbage separation, hygienic and less complex collection and disposal of household wastes is possible.

This object is substantially achieved, according to the invention, by the fact that:

a) the waste is packaged in portions, at the place where it is produced, by the fact that a plastic-film receptacle for the waste is produced, in the respective desired size, from a tubular film; and after filling, the plastic-film receptacles are heat-sealed and vacuum-packed; and b) the heat-sealed and vacuum-packed plastic-film receptacles containing the various kinds of waste are temporarily stored, unsorted, in at least one common collection vessel before being taken, also unsorted, to the central collection point.

While with the known method the garbage is collected in relatively large garbage bags, which in single-family houses are generally located in the garage and in multi-family houses are provided at a central garbage collection point, and are sealed only in order to be carried off to the garbage dump, according to the invention provision is made for the waste to be packaged at the place where it is produced, i.e. directly in households, by heat-sealing and vacuum-packing the plastic-film receptacles. What is essential here is that the waste is packaged in portions, i.e. in small quantities, so that the plastic-film receptacles remain open for only a minimal time, thus ensuring that contamination by spores, bacteria, maggots, etc., or unpleasant odors, cannot occur. The volume of wastes to be collected is also reduced, so that the garbage bins made available can be comparatively small.

The plastic-film receptacles are hermetically sealed as a result of heat-sealing and vacuum-packing, as is known per se from printed documents U.S. Pat. No. 5,027,578, U.S. Pat. No. 5,425,456, U.S. Pat. No. 4,044,524, and Patent Abstracts of Japan, Vol. 18, No. 483 (M-1670), Sep. 8, 1994, but only for the heat-sealing of plastic-film receptacles in standard sizes. In contrast thereto, according to the invention the plastic-film receptacles are produced from the tubular film in the respective size that is desired or required, so that almost no scrap results.

Packaging the waste in portions under vacuum yields the additional advantage that the individual small garbage units are very manageable and stable, which simplifies their handling. It has been found, in particular, that there is very little tendency for the plastic-film receptacles to tear, which can happen much more often with large, heavily packed garbage sacks.

Lastly, packaging of the waste in portions directly in households has the advantage that the heat-sealed and vacuum-packed plastic-film receptacles containing the various kinds of waste can easily be stored temporarily, unsorted, in a common collection vessel, before being taken, also unsorted, to the central collection point.

Because the household wastes are vacuum-packed in portions at the point where they are produced, i.e. in households, there is also no danger of contamination by spores, bacteria, maggots, etc., so that waste hygiene is perfect.

Vacuum-packing also contributes to a reduction in the volume of the wastes being collected, so that the garbage bins can be made comparatively small and the bins need to be emptied less often.

Particularly good garbage hygiene is achieved if multiple portions of waste are collected in each of the plastic-film receptacles and each portion is individually packaged by heat-sealing and vacuum-packing. This makes it possible to package the garbage under vacuum directly after it is produced without thereby wasting packaging material.

According to a preferred embodiment, a tubular film which is open at both of its axial ends is used to form the plastic-film receptacles, the one open end being closed in particular by means of a heat-sealing procedure, and waste being introduced through the end which is still open. The use of tubular films makes it possible to produce plastic-film receptacles in the particular desired size and without substantial scrap, by closing the filled portion of the tubular film and cutting it off from the tubular film to the appropriate length.

The waste introduced into the tubular film is packaged, according to a further embodiment of the invention, by closing off the filled portion of the tubular film by means of a first heat-sealing operation, forming a first heat-sealed seam; withdrawing the air from the filled portion of the tubular film by means of, in particular, a vacuum pump or an extractor fan and completing the vacuum by means of a second heat-sealing operation, forming a second heat-sealed seam which lies between the first heat-sealed seam and the waste; and lastly detaching the sealed plastic-film receptacle. Packaging of the waste introduced into the tubular film by forming two parallel heat-sealed seams has the advantage that the first heat-sealed seam, which is produced before evacuation of the plastic-film receptacle, can simultaneously form the bottom of the next plastic-film receptacle when the plastic-film receptacle is separated at a suitable point from the tubular film, so that handling is easy. The second heat-sealed seam, by means of which the evacuated plastic-film receptacle is sealed, can be configured, for example, as a defined break point, and for that purpose can be configured with differing thickness in its longitudinal direction.

Figure 2:
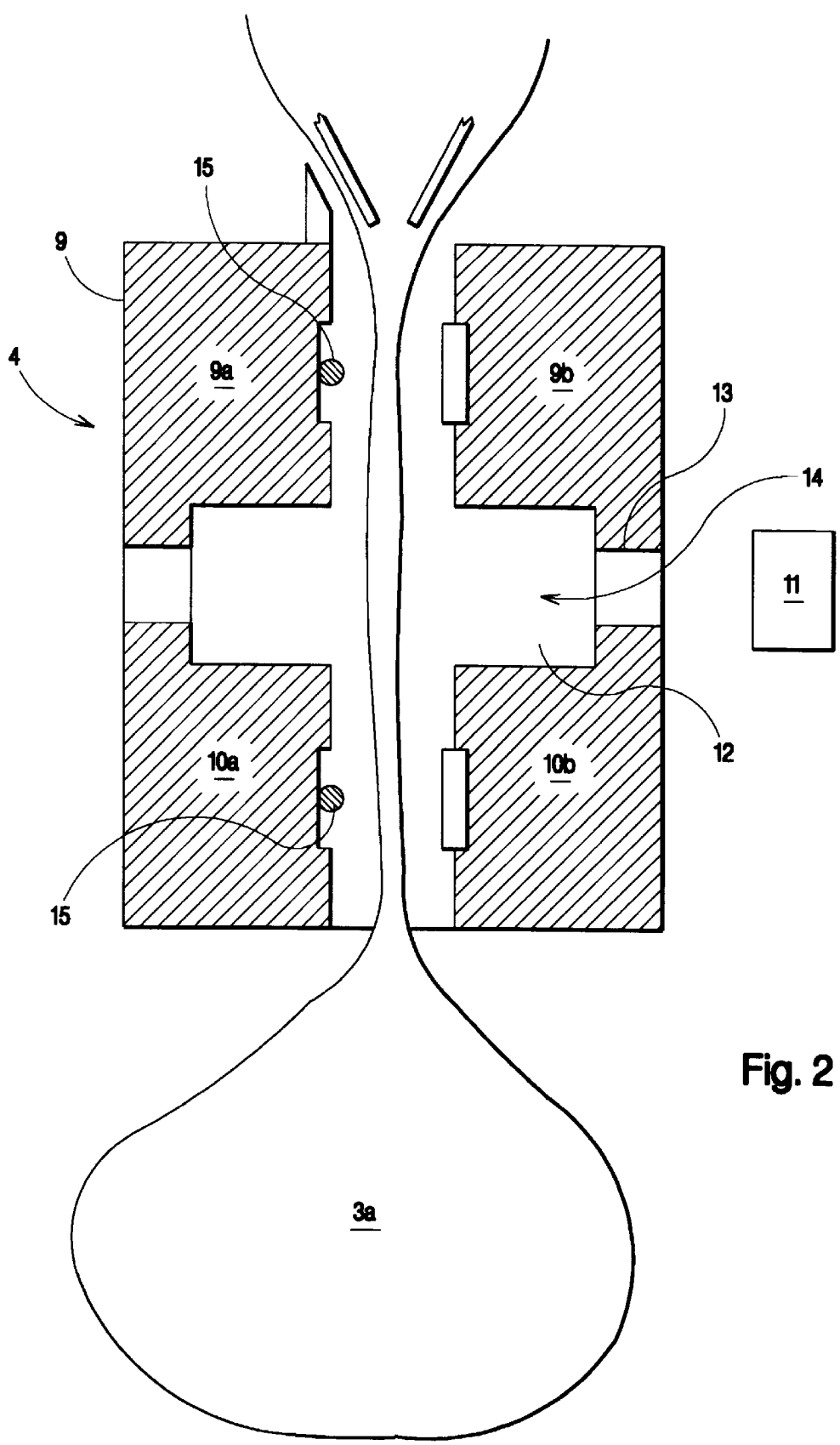

Regarding further advantageous embodiments of the method according to the invention, reference is made to the dependent claims and to the description below of an exemplifying embodiment with reference to the drawings, in which:

FIG. 1 shows, in a schematic view, the individual steps which are performed in the method as defined in the present invention; and FIG. 2 shows, in a sectioned view, a heat-sealing and vacuum-packing device that is used to carry out the method depicted in FIG. 1.

In the method according to the invention for collecting and disposing of household wastes, waste 1 is separated according to materials recycling criteria, and the individual types of garbage—such as organic garbage, plastics, and other garbage—are collected separately from one another in plastic-film receptacles 3a, 3b, 3c which can be distinguished from one another by corresponding markings 2a, 2b, 2c. Markings 2a, 2b, 2c can be of different kinds. For example, symbols for the substances for which they are intended can be provided as markings 2a, 2b, 2c. Alternatively, it is also possible, in known fashion, to select different colors for plastic-film receptacles 3a, 3b, 3c.

In the present case, what is used as plastic-film receptacles 3a, 3b, 3c are tubular films made of biodegradable material, which are each rolled up in the manner of a condom to form an annular bead 7 at the top and can be pulled off downward from annular bead 7, the open lower end of the portion of the tubular film hanging down from annular bead 7 being sealed by means of a heat-sealing operation in order to form pouch-like plastic-film receptacles 3a, 3b, 3c. Annular bead 7 defines an opening 8 through which plastic-film receptacles 3a, 3b, 3c can be filled with waste 1.

When plastic-film receptacles 3a, 3b, 3c are sufficiently filled with waste 1 (the particular quantity being determined according to the user's wishes), waste 1 is heat-sealed under vacuum by means of a heat-sealing and vacuum-packing device 4. In this context, it is possible to collect several small portions of waste in each plastic-film receptacle and individually package each portion by heat-sealing and vacuum-packing.

Plastic-film receptacles 3a, 3b, 3c, thereby sealed in air-tight fashion and containing different wastes, are then temporarily stored together, unsorted, in a collection vessel 5, for example a garbage bin, and taken by conventional garbage transport vehicles 6 to a garbage dump. There plastic-film receptacles 3a, 3b, 3c are sorted again on the basis of their contents, either manually or automatically, and sent on for further processing.

With this method, the various household wastes are thus collected separately from one another, but stored temporarily and transported to a garbage dump together, and only there separated from one another for final processing. Only one garbage bin therefore needs to be present in each household, and garbage transport vehicles 6 also do not need to be specially configured in order to be able to carry off the various kinds of waste.

In addition, it is possible to equip the plastic-film receptacles with a code to identify the consumer and/or the contents of the plastic-film receptacles, so that it is possible to determine garbage disposal costs in accordance with actual use.

Coding is preferably accomplished by means of a corresponding configuration of the heat-sealed seams on the plastic-film receptacles. For example, an electrical light radiator can be used to produce the heat-sealed seams, with which it is possible to configure heat-sealed seams of differing thicknesses over their length, in the manner of a barcode.

FIG. 2 depicts an embodiment of a heat-sealing and vacuum-packing device 4 as is used to seal plastic-film receptacles 3a, 3b, 3c with the method explained above. Device 4 comprises two heat-sealing units 9, 10 arranged one above another, and a vacuum-packing apparatus 11 provided between heat-sealing units 9, 10. Heat-sealing units 9, 10 each comprise a stationary heat-sealing jaw 9a, 10a on which a heating wire 15 is provided, and a movable heat-sealing jaw 9b, 10b that can be pressed substantially horizontally against stationary heat-sealing jaw 9a, 10a, the tubular film being in each case passed through between heat-sealing jaws 9a, 9b; 10a, 10b of heat-sealing units 9, 10.

Vacuum-packing apparatus 11 consists of a closed duct 12, extending over the entire width of the tubular film, over whose length a plurality of suction openings 13 are provided. Suction openings 13 each have a sharp-edged collar 14 which makes it possible to penetrate into the tubular film in order to pull a vacuum therein. Collars 14 can be heatable in order to burn holes into the film and thereby facilitate the insertion of collars 14 into plastic-film receptacle 3a.

To seal and vacuum-pack a plastic-film receptacle 3a, first upper heat-sealing unit 9 is actuated, causing plastic-film receptacle 3a to be sealed by forming a first heat-sealed seam. Then vacuum-packing apparatus 11 is actuated, and air is sucked out of the enclosed duct 12, causing the tubular film to be drawn against sharp-edged collars 14 so that the latter penetrate into the tubular film and create a vacuum in the interior of plastic-film receptacle 3a.

Lower heat-sealing unit 10 is then actuated in order to seal the evacuated plastic-film receptacle below the holes created by sharp-edged collars 14, and simultaneously detach it from the tubular film.

Lastly, heat-sealing jaws 9a, 9b, 10a, 10b of heat-sealing units 9, 10 are moved apart again so that additional tubular film can be pulled off downward from annular bead 7 for a new plastic-film receptacle. In the process, the first heat-sealed seam, which was produced in the previous sealing and evacuation procedure to seal the plastic-film receptacle, forms the bottom of the next plastic-film receptacle.

What is claimed is:

1. A method for collecting and disposing of wastes, in which the waste (1) is collected separately, on the basis of material recycling criteria, in plastic-film receptacles (3*a*, 3*b*, 3*c*) which can be distinguished from one another by corresponding markings (2*a*, 2*b*, 2*c*), and the plastic-film receptacles (3*a*, 3*b*, 3*c*) are taken to a central collection point for final storage or further use and there sorted according to their markings (2*a*, 2*b*, 2*c*), wherein said method comprises the steps of:

a) packaging the waste in portions at the place where it is produced, by:

producing, from a tubular film, a plastic-film receptacle (3*a*, 3*b*, 3*c*) for each portion of the waste in such a way that each plastic-film receptacle (3*a*, 3*b* 3*c*) has a variable size that depends upon the variable size of a respective one of said portions, filling each plastic-film receptacle (3*a*, 3*b*, 3*c*) with said respective one of said portions, and heat-sealing and vacuum-packing the plastic-film receptacles (3*a*, 3*b*, 3*c*) after filling; and b) temporarily storing, in an unsorted manner the heat-sealed and vacuum-packed plastic-film receptacles (3*a*, 3*b*, 3*c*) containing the various kinds of waste, in at least one common collection vessel (5) before taking such heat-sealed and vacuum-packed plastic-film receptacles (3*a*, 3*b*, 3*c*), also unsorted, to the central collection point.

2. The method as defined in claim 1, wherein multiple portions of waste (1) are collected in each of the plastic-film receptacles (3*a*, 3*b*, 3*c*) and each portion is individually packaged by heat-sealing and vacuum-packing.

3. The method as defined in claim 1, wherein the plastic-film receptacles (3*a*, 3*b*, 3*c*) are produced from a tubular film made of biodegradable plastic.

4. The method as defined in claim 1, wherein for packaging of the waste (1) introduced into the tubular film, the filled portion of the tubular film is sealed by means of a first heat-sealing operation, forming a first heat-sealed seam; the air is withdrawn from the filled portion of the tubular film by means of, in particular, a vacuum pump (11) or an extractor fan and the vacuum is completed by means of a second heat-sealing operation, forming a second heat-sealed seam which lies between the first heat-sealed seam and the waste (1); and the sealed plastic-film receptacle (3*a*, 3*b*, 3*c*) is detached from the tubular film.

5. The method as defined in claim 4, wherein for vacuum-packing, holes are punched or burned into the sealed plastic-film receptacle (3*a*, 3*b*, 3*c*), and the air is withdrawn from the plastic-film receptacle (3*a*, 3*b*, 3*c*) through said holes; and the second heat-sealed seam is applied to the plastic-film receptacle (3*a*, 3*b*, 3*c*) between the holes and the waste (1).

6. The method as defined in claim 5, wherein detachment occurs at the second heat-sealed seam, and for that purpose the second heat-sealed seam is configured with differing thickness in its longitudinal direction, forming a defined break point.

7. The method as defined in claim 4, wherein an electrical light radiator is used as the heat-sealing device at least for producing the second heat-sealed seam.

8. The method as defined in claim 1, wherein the plastic-film receptacles (3*a*, 3*b*, 3*c*) are equipped, in particular during the heat-sealing and vacuum-packing operation, with a code to identify the consumer.

9. The method as defined in claim 8, wherein coding takes place by means of suitable configuration of the heat-sealed seam on the upper side and/or the lower side of the plastic-film receptacles (3*a*, 3*b*, 3*c*).

10. The method as defined in claim 1, wherein plastic-film receptacles (3*a*, 3*b*, 3*c*) which have different colors in order to identify their contents are used.

11. The method as defined in claim 1, wherein the plastic-film receptacles are each equipped, in order to identify their contents, with symbols for the substances for which they are intended.

12. The method as defined in claim 1, wherein the heat-sealed and vacuum-packed plastic-film receptacles (3*a*, 3*b*, 3*c*) are weighed before being taken to the central collection point, and a cost calculation is made on the basis of the weight determined.

13. The method as defined in claim 1, wherein the plastic-film receptacles (3*a*, 3*b*, 3*c*) are sorted automatically at the central collection point, by detection of their markings or of a code provided.

* * * * *